No. 641,396. Patented Jan. 16, 1900.
A. DE LASKI.
INSTRUMENT FOR RECORDING COURSE AND SPEED OF VESSELS.
(Application filed Dec. 3, 1897.)
(No Model.) 4 Sheets—Sheet 1.

WITNESSES:

INVENTOR
Albert de Laski
BY
HIS ATTORNEY

No. 641,396. Patented Jan. 16, 1900.
A. DE LASKI.
INSTRUMENT FOR RECORDING COURSE AND SPEED OF VESSELS.
(Application filed Dec. 3, 1897.)
(No Model.) 4 Sheets—Sheet 3.

WITNESSES:

INVENTOR
Albert de Laski
BY
HIS ATTORNEY

No. 641,396. Patented Jan. 16, 1900.
A. DE LASKI.
INSTRUMENT FOR RECORDING COURSE AND SPEED OF VESSELS.
(Application filed Dec. 3, 1897.)
(No Model.) 4 Sheets—Sheet 4.
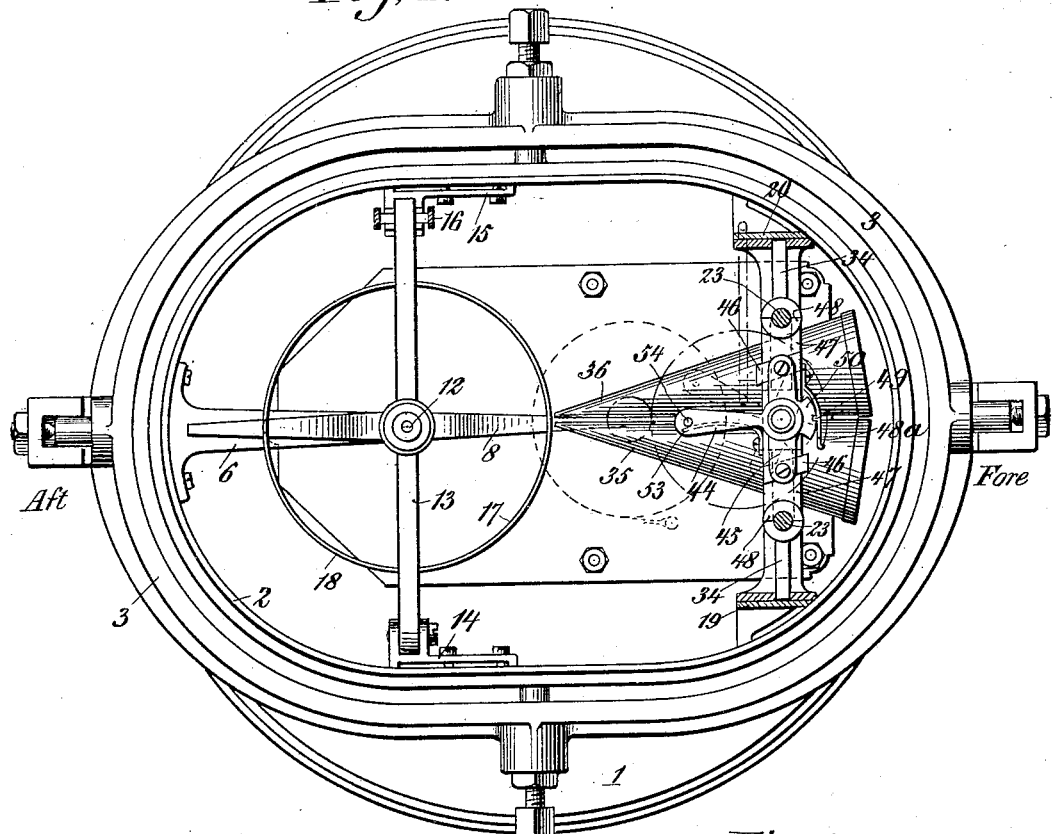
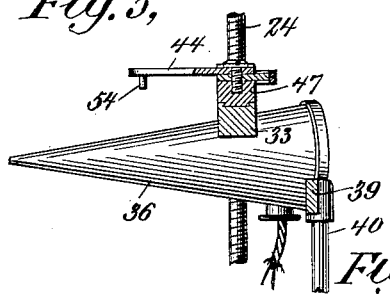
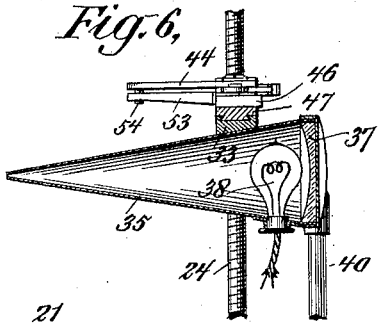
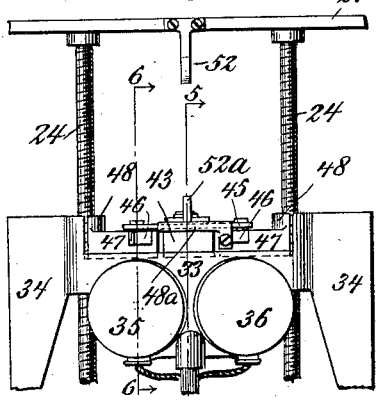
WITNESSES:
INVENTOR
Albert de Laski
BY
HIS ATTORNEY

UNITED STATES PATENT OFFICE.

ALBERT DE LASKI, OF NEW YORK, N. Y., ASSIGNOR OF ONE-THIRD TO EDWARD N. DICKERSON, OF SAME PLACE.

INSTRUMENT FOR RECORDING COURSE AND SPEED OF VESSELS.

SPECIFICATION forming part of Letters Patent No. 641,396, dated January 16, 1900.

Application filed December 3, 1897. Serial No. 660,586. (No model.)

*To all whom it may concern:*

Be it known that I, ALBERT DE LASKI, of the city, county, and State of New York, have invented a new and useful Improvement in Instruments for Recording Course and Speed of Vessels, of which the following is a specification.

My invention relates to an apparatus for recording a vessel's course and also its speed, and it may also be employed for recording the state of the barometer or speed of the screws of the vessel.

The invention consists, broadly, of a sensitized surface onto which it is adapted to record the course of a ship and also its speed by means of a ray or rays of light projected thereon by any suitable means.

My preferred form of apparatus consists of a magnetic needle on which is supported the sensitized surface, preferably in the form of a cylinder, and provided with marks on its periphery indicating the points of the compass and with other lines or marks indicating, preferably, the hours of the day and fractions thereof. In connection with this sensitized surface I employ a pair of cones, through the apexes of which rays of light are projected, by means of a mirror or other reflector at the other end of the cone, either continuously or intermittently, and the cones are adapted to travel in a vertical direction for a distance equal to the length of the cylinder, so that the rays of light will affect the sensitized surface in either a straight or irregular line, according to the ship's course, which affects the swinging of the needle and the sensitized surface carried thereby.

Figure 1:
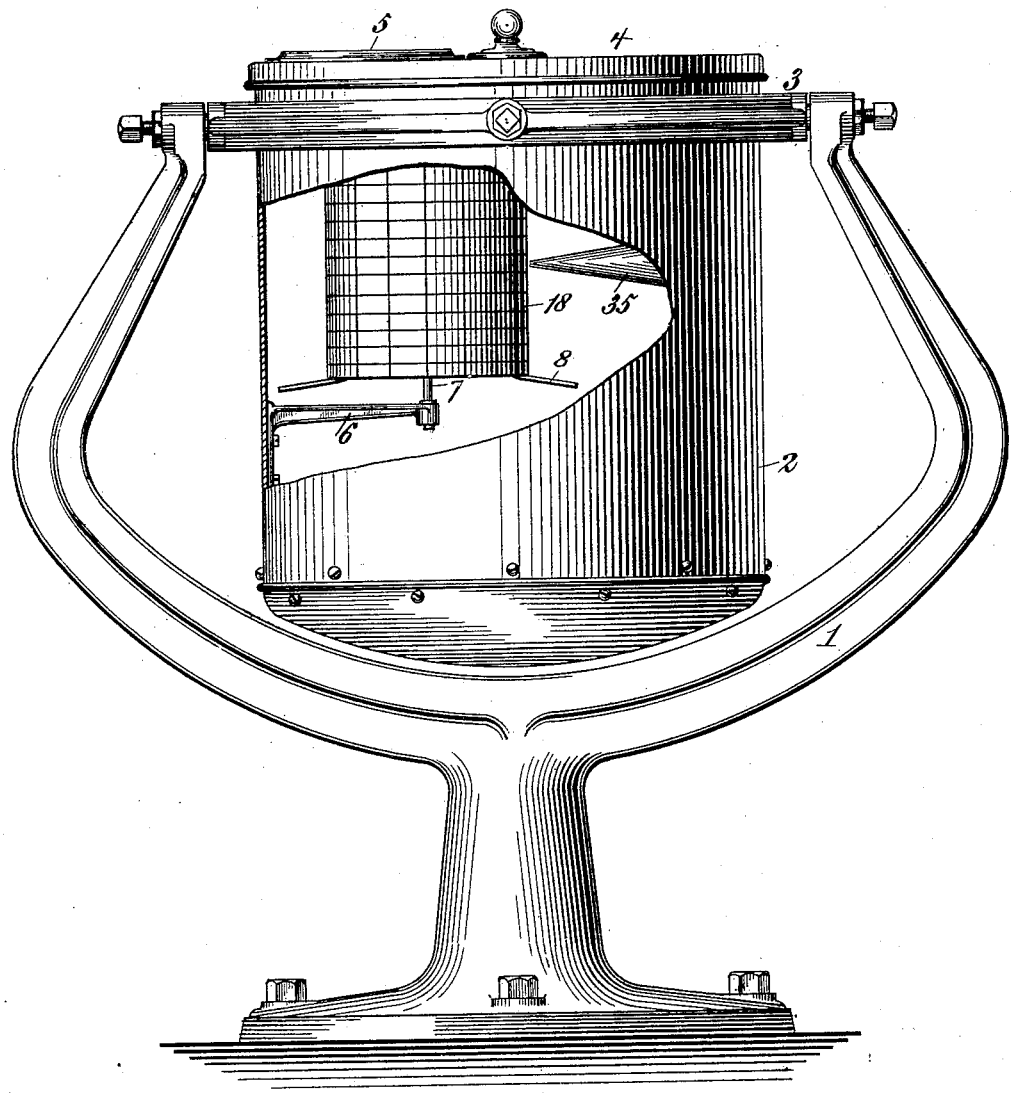
Figure 2:
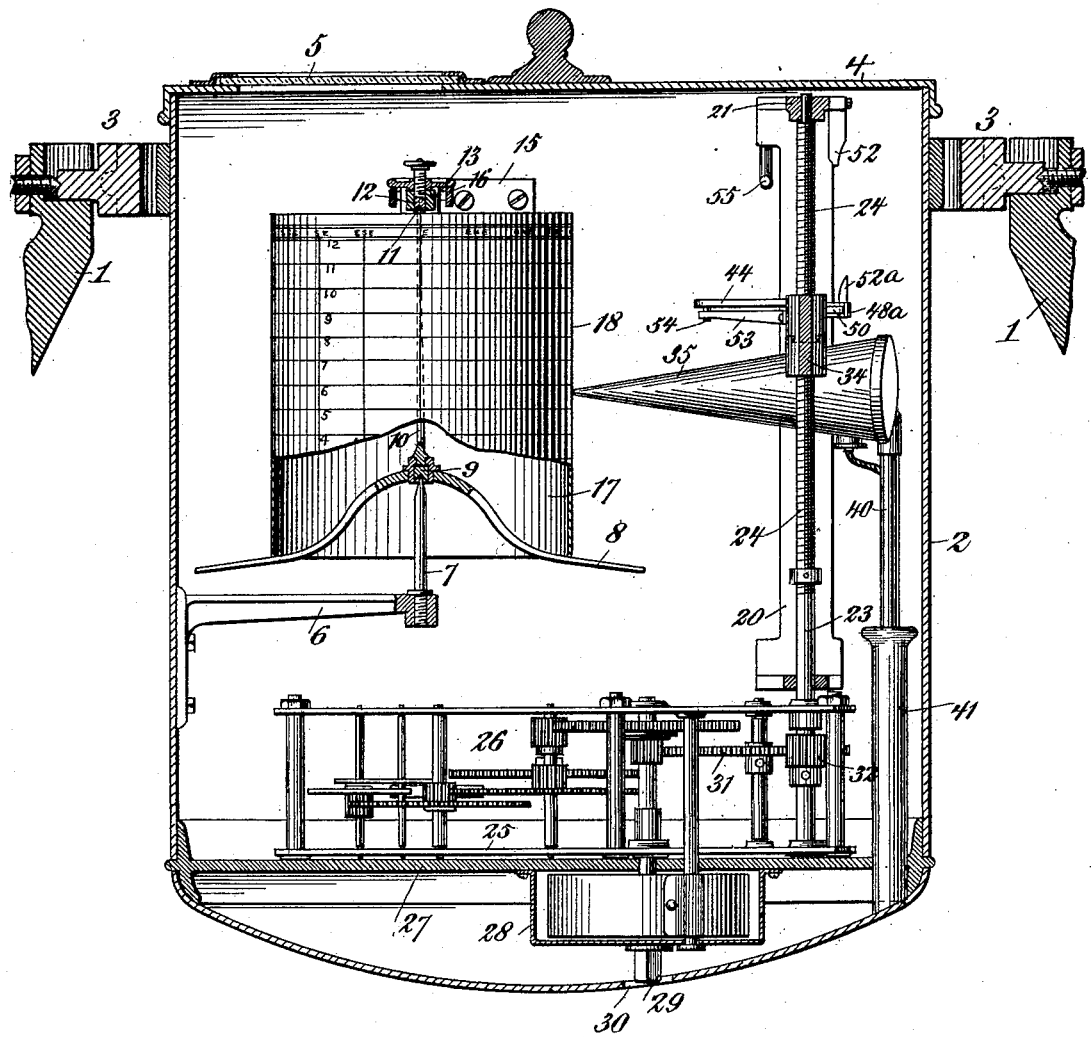
Figure 3:
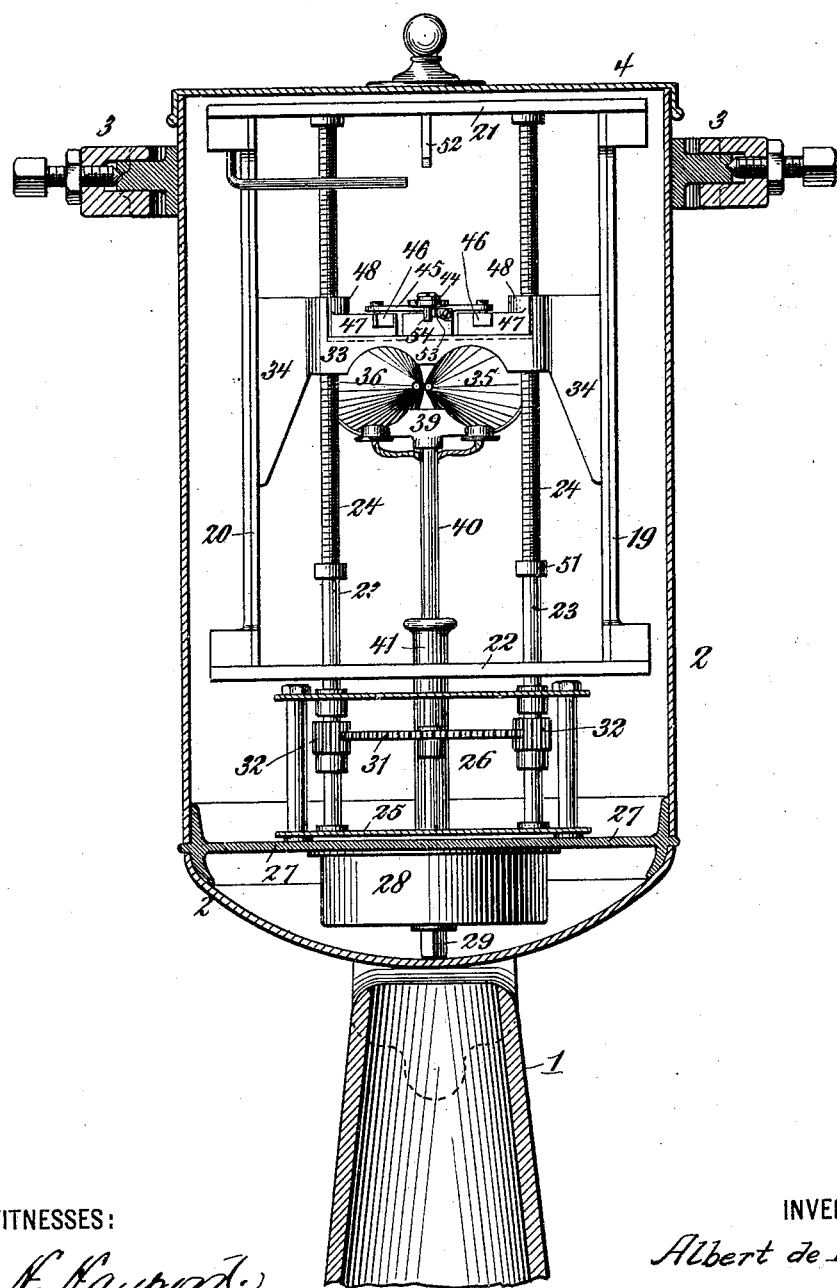

The apparatus will be readily understood from the accompanying drawings, in which—
Figure 1 is a front elevation of a support and compass-box, which is partly broken away to show the interior mechanism. Fig. 2 is a vertical section of the compass-box, showing the interior mechanism in elevation and which is drawn to a larger scale than that shown in Fig. 1. Fig. 3 is a vertical section of the compass box or casing in a plane at right angles to that shown in Fig. 2. Fig. 4 is a top plan view of the mechanism with the cover of the box or casing removed. Fig. 5 is a detailed sectional view taken on the line 5 5 of Fig. 7. Fig. 6 is a detailed sectional view taken on the line 6 6 of Fig. 7, and Fig. 7 is a detailed elevation view of the sliding support for the light-cones.

1 represents the usual form of support for a compass box or casing 2, which is, as usual, hung in the gimbal-rings 3 to allow for the pitching and rolling of the vessel in order that the said box or casing may be maintained in a vertical position. It is provided with a removable cover 4, which is removed when it is desired to set the mechanism or replace the sensitized surface. The cover 4 is also provided with an opening which is closed by a colored glass 5.

Attached to one side of the box or casing within the same is a support or bracket 6, carrying at its end a pointed rod 7, on which the magnetic needle 8 is supported by means of the jeweled bearing 9. The needle is further steadied and journaled by means of the pin 10, which projects upwardly from the bearing 9 and has its pointed end 11 held in the jeweled bearing 12, carried in a rod or brace 13, extending across the casing, as shown in Fig. 4. This rod 13 is preferably hinged at one end in a bracket 14, secured to the side of the casing, and its other end is removably held in a bracket 15, secured to the opposite side of the casing by means of a thumb-screw 16. With this form of journaling of the magnetic needle all likelihood of its being displaced or becoming out of plumb by reason of the rolling or pitching of the vessel is entirely obviated.

The needle 8, as will be seen, is bent so that the greater portion of its weight will be below its pivotal point, and it supports a cylinder 17 of any light material, such as aluminium. This cylinder is held on the needle so that it will turn with it and will not be displaced therefrom. On the outer surface of the cylinder 17 a sensitized surface is adapted to be placed and removed therefrom as desired. This sensitized surface 18, which is made from blue-print or other photographic paper, has marked on it the several points of the compass, as shown in Fig. 2, and it also has a number of lines—for example, twelve—extending around it, which are used to designate the hour-periods of half a day. If desired, the spaces between the lines may be further divided to indicate smaller parts of the hour, such as five minutes, quarter of an hour, &c. This surface is adapted to be placed on the cylinder through the top of the box or casing and onto the cylinder after the cross-bar 13 has been raised, and it is held thereon by reason of its tightly fitting the cylinder. In placing the sensitized surface on the cylinder the mark thereon representing north should be placed directly over the point of the needle which points toward the cones.

19 and 20 represent guide-pieces which are secured in the box or casing in front of the needle, being joined at top by the cross-piece 21 and at the bottom by the cross-piece 22. Passing through the bottom piece 22 are a pair of rods 23, screw-threaded at 24 for a portion of their length and journaled at one end to the cross-piece 21 and at their other end in one of the side pieces 25 of the framework, which incloses a clock mechanism 26. This clock mechanism is supported on a floor or support 27, and the mainspring of the mechanism is inclosed in a supplemental casing 28, through which the winding-arbor projects, and a key may be applied thereto through an opening 30 in the box or casing 2. The rods 23 are revolved in their bearings by means of the cog-wheel 31 of the clock mechanism engaging with the pinion 32, secured on the lower end of the said rods. 33 represents a supporting cross-piece through which the rods 23 pass, and it is provided with the extensions 34 in engagement with the guides 19 and 20 in order that it may be guided and steadied in its movements up and down the rods 23. This cross-piece is adapted to carry the means for producing the ray or rays of light which are projected upon the sensitized surface in order that the course and speed of the ship may be recorded. In the present instance I have employed two cones 35 and 36, which are respectively used for recording the course and the speed of the ship. These cones are supported from the cross-piece 33 in any desired manner, and they are formed so as to have a very small opening, which is in close proximity to the sensitized surface, so that there will not be a diffusion of the rays, thereby enabling a sharp line to be produced on the surface. The cone 35 is in a direct line with the magnetic needle, while the cone 36 is a little to one side of that line. The large end of each cone is provided with a mirror or reflector 37 and with an incandescent light 38, supported on the cross-piece 39, carried by the hollow tube 40, which telescopes into the tube 41, secured to the bottom of the box or casing 2. The feed-wires for the respective lights in the cones pass down through the tube 40 to any electrical source. The current to the light in the cone 35 is supplied continuously thereto, while the current for the light in the cone 36 may be supplied intermittently. This may be done by interposing a switch into the circuit of said lamp, which is operated by the log mechanism at intervals, so that instead of a continuous line to indicate the speed of the ship a ray of light will be projected onto the sensitized surface at intervals corresponding to the distance traveled.

Located on top of the cross-piece 33 is a block 43, on which a lever 44 is pivoted. This lever 44 is provided with extensions or projecting portions 45, which have connected with them blocks 46, provided with parallel inclined faces engaging inclined grooves formed in sliding blocks 47. These blocks 47, which are carried by the cross-piece 33, are provided at their ends with half-collars 48, having a screw-thread on their inner surface which is normally in engagement with the screw-threaded portion of the rods 23. When the lever 44 is in the position shown in Fig. 4, the blocks 46, carried by the wings 45, are in such position that the half-collars upon the blocks 47 will be held in engagement with the screw-threaded portion of the rods 23. The lever is held in this position by means of the spring $48^a$, provided with a projection 49, which is fitted in a recess formed for it in the tail portion 50 of the lever 44. The parts just described are in this position when the device is set in operation, and at that time the cross-piece 33, carrying the light-cone, rests upon the collars 51 on the rods 23. As the rods are turned by the clock mechanism the light-cones will be carried upward until the end of the twelfth hour, at which time a signal may be operated to give notice of this fact—as, for instance, by any well-known electrical device—and at which time the following means operate to disconnect the half-collars 48 from the rods 23 to prevent the further movement of the light-carrying cones. These means consist of a downwardly-projecting arm 52, having a wedge-shaped end engaging with an upwardly-projecting piece $52^a$, carried by the spring $48^a$, to cause the projection 49 to become disengaged from the tailpiece 50 and allow the spring 53, carried by the cross-piece 33 and bearing against a stud on the lever, to push the lever 44 to one side, so that the blocks 44 will move out of the inclined recesses 46 and cause the sliding blocks to move inward and the collars to be disengaged from the rods 23. As the lever 44 is pushed to the dotted position shown in Fig. 4 it will be directly over a catch 55, carried by the cross-piece 21, which serves to hold the light-cones in their elevated position. At this time an attendant, who has been warned by the signal, removes the cover 4, changes the sensitized surface on the cylinder, and resets the light-carrying cones for a further recording of the course and speed of the vessel.

The operation of my device is as follows: The sensitized surface, prepared as hereinbefore stated, is placed upon the cylinder carried by the magnetic needle and the light-carrying cone adjusted to the first line on the paper, which represents the beginning of the hour. The current is supplied to the cone which projects the rays for recording the course of the ship and the clock mechanism started. It will be seen from the arrangement shown and described that as the ship's course is changed from point to point the needle will be deflected, carrying the sensitized surface with it, and as the ray of light from the course-cone does not swing with the needle, but is in line with the fore-and-aft part of the ship, the course of the ship will be printed or recorded on the sensitized surface. As before stated, the current for the cone which projects the ray of light to indicate the speed will be under the control of a switch operated by the log mechanism, so that at intervals the light will be projected onto the sensitized surface, which will indicate the speed of the vessel on that particular part of the course for a given period of time. If any other light than an electric light be used to indicate the speed, it will be necessary to provide a shutter in the cone which will be operated at intervals to allow the light to act on the sensitized surface. When the ship has traveled twelve hours, the sensitized surface is removed and a new one substituted, the old one being developed to serve as a record of the day of the ship's course and also the speed.

It is evident that instead of employing the second cone to record the speed of the ship both records may be made with the single cone, the log mechanism serving to break the circuit of the lamp at mile or other intervals to form a series of breaks in the course-record corresponding to the series of points obtained by means of the apparatus described.

What I claim as new is—

1. In a recording instrument the combination of a surface adapted to receive a record, a magnetic needle for moving said surface, and means for tracing said record upon said surface, substantially as specified.

2. In a recording instrument the combination of a surface adapted to receive a record, said surface having marked thereon divisions representing the points of the compass and the hours of the day, means for tracing a record upon said surface, means for moving said tracing means across said surface, and a magnetic needle for moving said surface, substantially as specified.

3. In a recording instrument the combination with a surface adapted to receive a record, of means for tracing lines upon said surface, means for moving said tracing means across said surface, and means for moving said surface synchronously with the variations of a ship's course, substantially as specified.

4. In a recording instrument the combination with a sensitized surface, of a magnetic needle for moving said surface, and means for projecting a ray or rays of light thereon, substantially as specified.

5. In a recording instrument the combination with a sensitized surface carried upon a magnetic needle, of means for projecting light thereupon, and means for moving said light across said surface, substantially as specified.

6. In a recording instrument the combination with a sensitized surface ruled to indicate the points of the compass and the hours of the day, of a magnetic needle for carrying said surface, means for projecting a ray or rays of light upon said surface, and means for moving said ray or rays from the first to the last of the said hour divisions, substantially as specified.

7. In a recording instrument the combination with a sensitized cylindrical surface, of a magnetic needle carrying said surface, means for projecting light in a point or points upon said surface, means for moving said light-projecting means across said surface, and means for stopping said movement, substantially as specified.

8. In a recording instrument for vessels or analogous objects the combination with a sensitized cylindrical surface ruled to indicate the divisions of the compass and of the day; of a magnetic needle, means operatively connecting said needle and said surface whereby a change in the course of the vessel will effect a corresponding movement of the said cylindrical surface, relatively to the vessel, means for projecting light upon said surface, and means for moving said light over said surface, substantially as specified.

9. In a recording instrument the combination with a magnetic needle, of a sensitized vertical cylindrical surface carried upon said needle, means for projecting a ray or rays of light upon said surface, and means for moving said ray or rays from the bottom to the top thereof, substantially as specified.

10. In a recording instrument the combination with a sensitized surface carried upon a magnetic needle, of means for continuously projecting a ray or rays of light upon said surface, means for intermittently projecting a ray or rays of light upon said surface, and means for causing said light-projecting means to travel across said surface, substantially as specified.

11. In a recording instrument for vessels or analogous articles the combination with a sensitized surface carried upon a magnetic needle, of means for projecting a ray or rays of light upon said surface, means for cutting off said rays from said surface at regular intervals of distance in the vessel's travel, means for causing said light-projecting means to travel across said surface, and means for stopping said movement, substantially as specified.

12. In a recording instrument the combination with a sensitized surface, of means for projecting a ray or rays of light thereupon, consisting of a hollow receptacle, a support therefor, a source of light contained within said receptacle, and an aperture in said receptacle through which rays of light may project upon said surface, substantially as specified.

13. In a recording instrument the combination with a sensitized surface, of means for projecting a ray or rays of light thereupon consisting of a source of light, and a receptacle therefor—said receptacle having a tapering form and an opening at the end thereof, substantially as specified.

14. In a recording instrument the combination with a sensitized surface, of means for projecting a pencil of light thereupon, consisting of a hollow cone having an exit for the light-rays at the apex thereof, a source of light contained within said cone, a reflecting-surface at the base of said cone, and a support for said cone, substantially as specified.

15. In a recording instrument the combination with a surface adapted to receive a record, of means for tracing said record, and means for moving said tracing device over said surface, said means consisting of a support for said tracing device, a screw-threaded rod in connection with said support, and clockwork for rotating said screw-threaded rod, substantially as specified.

In testimony whereof I have signed my name to this specification in the presence of two subscribing witnesses.

ALBERT DE LASKI.

Witnesses:
   Geo. E. Cruse,
   K. G. Le Ard.